May 25, 1937.  F. M. RUSH  2,081,409
BEVERAGE BOTTLE SHIELD AND GRIPPING DEVICE
Filed May 13, 1935
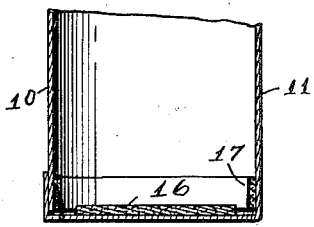
Fig. 4. Fig. 5.
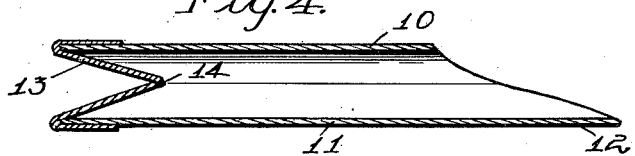
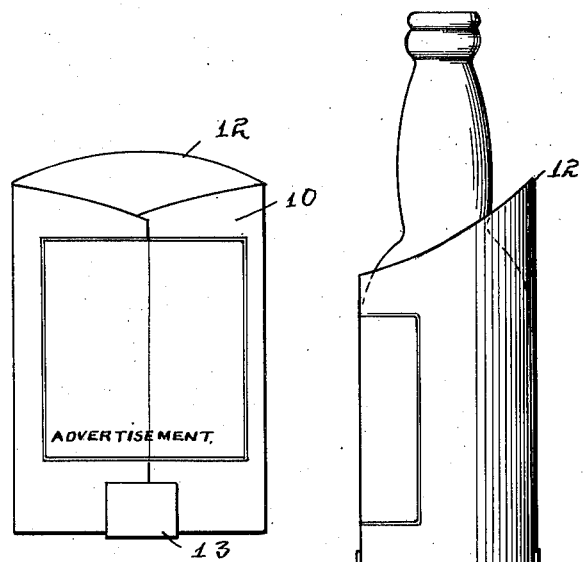
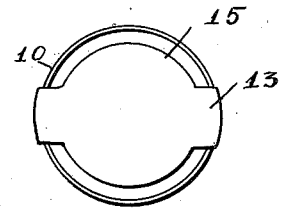
Fig. 6.
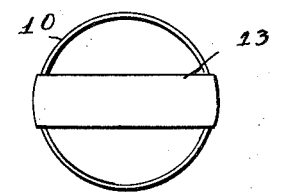
Fig. 3.
Fig. 2. Fig. 1.
Inventor
Francis M. Rush,
by Orwig & Hague, Att'ys Patented May 25, 1937

2,081,409

UNITED STATES PATENT OFFICE 2,081,409

BEVERAGE BOTTLE SHIELD AND GRIPPING DEVICE

Francis M. Rush, Des Moines, Iowa

Application May 13, 1935, Serial No. 21,194

1 Claim. (Cl. 215—100)

In connection with the sale of beverages, especially those having effervescent qualities, it is customary, in many instances, to serve the beverages to the customers in the bottles in which the beverages were originally contained. On account of the effervescent qualities of some of these beverages the foam and water condensation gathered on the bottles will run down the sides thereof and soil the customers' hands and table linen, napkins, etc. In many instances at the present time these bottled beverages are prepared for the customers' use by wrapping around the bottle a paper or fabric napkin. This, however, is objectionable because the napkin is not firmly held to the bottle and sometimes the bottle slips out of the napkin, and at other times the napkin falls away from the bottle.

The object of my invention is to provide a device of simple, durable and inexpensive construction susceptible of being commercialized as an advertising novelty, which, when manufactured and shipped, will be in flat form to occupy a minimum of space, and into which the beverage dispenser may readily, quickly and easily insert a bottle after it is opened, and, when once inserted, the shield and gripping device will be firmly applied to the bottle, and all of the foam and water condensation gathered on the bottle will be collected and retained on the interior of the shield and gripping device, so that it will not soil the customer's hands, nor table linen and napkins, etc.

A further object is to provide a device of this class having highly absorbent and heat insulating qualities, so that a relatively cold bottle will not be objectionable on account of its coldness in the customer's hands, and also so that the heat from the customer's hands resting upon the bottle will not too quickly warm up the beverage.

A further object is to provide a device of this character in which, when the bottle is inverted to pour out its contents, none of the liquids contained within the shield and gripping device can flow out of the top thereof, which would be highly objectionable if the customer was drinking from the bottle.

My invention consists in the construction, arrangement and combination of the various parts of the device, whereby the objects contemplated are attained, as hereinafter more fully set forth, pointed out in my claim, and illustrated in the accompanying drawing, in which:

Figure 1 shows a side elevation of my improved shield and gripping device with a beverage bottle inserted therein as in use.

Figure 2 shows a front elevation of my improved device in its folded position.

Figure 3 shows a bottom view of my improved device in its expanded position and illustrating the bottle holding strip at the bottom of the device.

Figure 4 shows a longitudinal sectional view of my improved device in its folded position.

Figure 5 shows a vertical central sectional view of the lower portion of my improved device illustrating a modification; and Figure 6 shows a bottom view of my improved device illustrating a modification, and partly broken away to show the position of a bottle therein.

Referring to the accompanying drawing it will be seen that my improved shield and gripping device has a body portion formed of one strip of relatively stiff absorbent material, such as paper, and it comprises a front 10 and back 11, and is open at both the top and the bottom. This strip is preferably united by adhesives along the central portion of the front.

The back member 11 is provided with an upwardly extended bottle guiding member 12.

At the bottom I have provided a bottle holding member 13 formed of a strip of relatively tough material, such as paper, which is connected at one end to the central portion of the front and the other with the central portion of the back, and is folded at 14 at its central portion so that the entire device may be folded flat and a large number of them contained in a small space.

In the modified form shown in Figures 5 and 6 I have illustrated that the bottle holding member 13 is provided at its central portion with a round or disc shaped portion 15, and on the upper surface thereof I have placed, by means of adhesives, a disc shaped member 16 formed of highly absorbent material such as blotting paper. This member consisting of the parts 13, 15 and 16 is intended to be folded in the same manner as the member 13 illustrated in Figure 4.

In Figure 5 I have illustrated another modification which consists of a strip of highly absorbent material 17 secured by adhesives to the interior of the device and extended completely around it near the bottom thereof.

The length of the device is such that when a beverage bottle is placed therein in the position shown in Figure 1, the upper edges of the device will project somewhat above the enlarged body portion of the bottle and toward the bottle neck, so that foam or water of condensation traveling down the neck of the bottle will be directed to the interior of the shield and gripping device and will not overflow to the exterior thereof.

My improved shield and gripping device may be advantageously used on drinking glasses and the like. When intended for use on drinking glasses, I preferably shape the device so that its upper edge projects outwardly from the sides of the glass to catch any drip from the glass or water of condensation from the outer surface of the glass. This may be accomplished by simply shaping the shield and gripping device in a tapering form slightly wider at the top than at the bottom.

In practical use it will be seen that my improved device is of very simple, durable and inexpensive construction, and may be commercialized as an advertising novelty. A large number of them may be packed and shipped in a comparatively small space, and they are of light weight. In use, the operator first removes the stopper of the bottle and then, by grasping the shield and protector in one hand, he may, by squeezing together the folded side edges thereof, bring the shield and gripping device into a substantially rounded position. He then places the bottom portion of the bottle against the guide member 12, and this guide member directs the bottle quickly and easily into the interior of the shield and gripping device until the bottom of the bottle strikes the bottle holding member 13. This will cause the bottle holding member to straighten out and prevent any downward movement of the bottle relative to the holder. The bottle, with the shield and protector device on it, is then delivered to the customer and may be held in the customer's hands while drinking or may be poured into glasses, as desired. When the customer holds the shield and guide device in his hand, the heat insulating qualities of the material of which the device is formed performs two functions, in that it prevents the warmth from the customer's hands from too quickly cooling the contents of the bottle, and it also insulates the cold from the bottle so that the customer's hand is not objectionably cooled.

When pouring from the bottle in an inverted position my improved device absolutely precludes the possibility of any of the liquid contained within the shield and protector from being poured out of the shield and protector, which would be very objectionable if the customer were drinking from the bottle.

When the shield and gripping device is made of a paper that is sufficiently absorbent, I have found, in practice, that all of the foam and water of condensation usually present on the exterior of a beverage bottle will be retained within the shield and gripping device, but, in the event that the shield and protector should be made of a material not sufficiently absorbent, then I have provided the modifications shown in Figures 5 and 6 in which a disc shaped member 16 of highly absorbent material, such as blotting paper, is secured to the top surface of the bottle holding member at the bottom of the device; and in addition to that, I have placed around the interior of the device, near its bottom, a strip of highly absorbent material 17, which I have found to be sufficient to absorb all of the beverage which is likely to run down the exterior of the bottle. However, in the event of there being, for accidental reasons or otherwise, a surplus of liquid on the exterior of the bottle running down the interior of the device, then this liquid will run out of the open bottom of the device upon the table or elsewhere, and will not be poured out of the top of the device when the customer is drinking from the bottle.

I claim as my invention:

A beverage bottle shield and gripping device comprising a body portion formed of flexible material substantially cylindrical in form open at both ends and having longitudinal folds at diametrically opposite sides whereby it may be folded to position with one-half of the body portion lying flat against the other half and a bottom member formed of a strip of flexible material united at its ends to opposite sides of the body member at points midway between said folds in the body, said bottom member being formed with a fold at its transverse central portion and being spaced apart and disconnected from the body portion at its side edges, for the purposes stated.

FRANCIS M. RUSH.